United States Patent [19]

Takemura et al.

[11] 4,101,312

[45] Jul. 18, 1978

[54] METHOD FOR OPERATION OF A CONVERTER

[75] Inventors: Yozo Takemura, Chita; Shigeyoshi Fukuda; Sadashi Ogino, both of Tokai, all of Demo. Peoples Rep. of Korea

[73] Assignee: Nippon Steel Corporation, Tokyo, Japan

[21] Appl. No.: 701,943

[22] Filed: Jul. 1, 1976

[30] Foreign Application Priority Data

Nov. 14, 1975 [JP] Japan ................................. 50-137033

[51] Int. Cl.$^2$ .............................................. C21C 7/00
[52] U.S. Cl. ............................................ 75/52; 75/60
[58] Field of Search ....................................... 75/51–60

[56] References Cited

U.S. PATENT DOCUMENTS 3,476,550  11/1969  Ledune ..................................... 75/52

*Primary Examiner*—P. D. Rosenberg
*Attorney, Agent, or Firm*—Toren, McGeady and Stanger

[57] ABSTRACT

Method for operation of a converter, wherein formed slag is made inert by lowering its temperature through adding of cooling medium, such as burntlime, burnt dolomite, limestone, dolomite, scrapbrick, converter slag, etc. immediately after shutdown of the oxygen blowing for refining, thus improving the productivity as well as the quality of steel.

3 Claims, 4 Drawing Figures

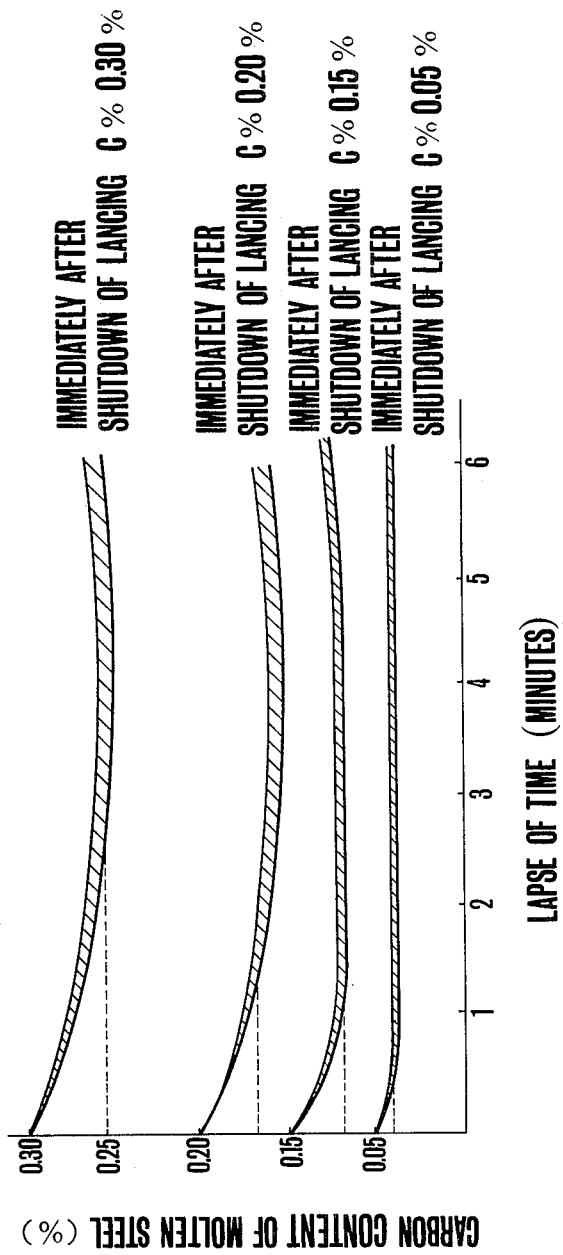

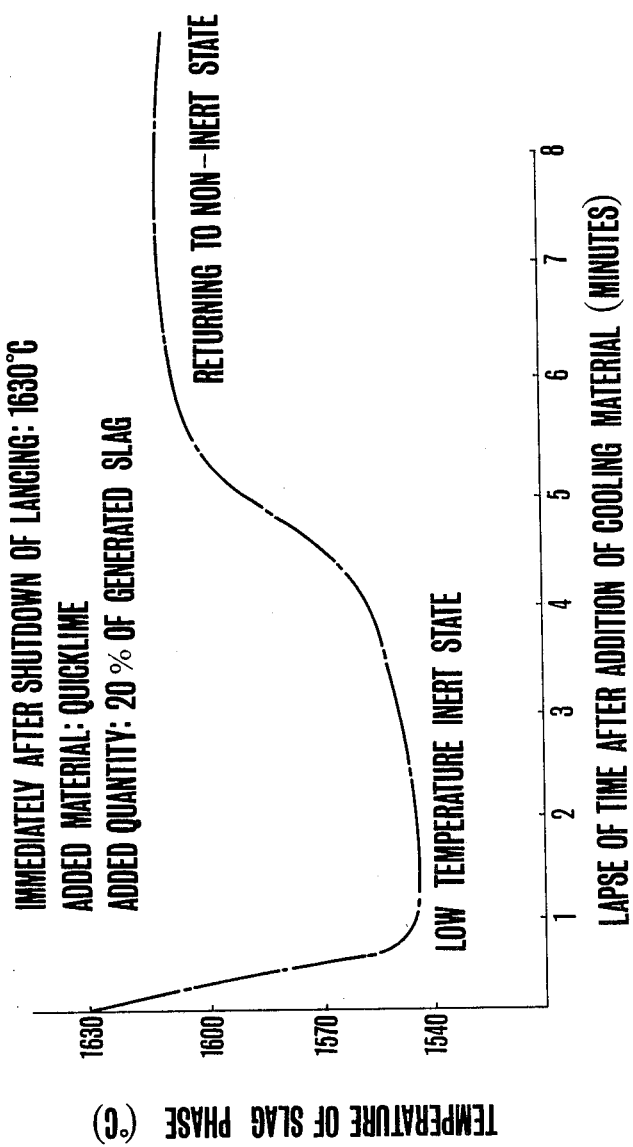

METHOD FOR OPERATION OF A CONVERTER

BACKGROUND OF THE INVENTION

In the operation of a converter, there are two methods for controlling the same, i.e. static controlling and dynamic controlling.

In the static controlling, the accuracy of the end point is extremely bad, while in the dynamic controlling, the accuracy of the end point (percentage of obtaining proper values of carbon and temperature) is about 100%, and under such conditions of operation, molten steel is poured out within 30 to 60 seconds after shutdown of the oxygen blowing for refining.

In the usual static controlling, the pouring out of molten steel is effected, using about 4 to 10 minutes, after the shutdown of the oxygen blowing, for temperature measurement sampling, re-refining, etc. However, recently the pouring out of the molten steel has been effected for 30 to 60 seconds after the shutdown of oxygen flowing to improve the operation of the converter as well as the productivity of the steel, although a significant problem has arisen in the operation of steel making.

Namely, immediately after oxygen blowing for refining, formed slag and oxygen in molten steel are not under an equilibrium state, so that if the molten steel is poured out immediately after shutdown of the oxygen blowing, the slag and the molten steel will react for 3 to 7 minutes during the pouring out of the molten steel to cause a decarburization reaction, thus decreasing the carbon in the molten steel. It has been found that the temperature will lower due to boiling by the reaction at this time. This means that although the blowing values of the carbon and temperature at the time of the shutdown of the oxygen are proper, if the molten steel is poured out immediately, the composition and temperature thereof within a ladle will not meet our expectations due to the reaction between the slag and molten steel during the pouring out thereof. This is a very important problem on the quality control.

As shown in FIG. 3, the reaction between slag and molten steel continues for at least 3 to 4 minutes after shutdown of the oxygen blowing, and even if the carbon and temperature are proper in the dynamic control, unless the molten steel is kept stationary for 3 to 4 minutes and is poured out after completion of the reaction between slag and molten steel, the object of the operation of steel making and the effects of the dynamic control on the steel making are significantly decreased or lost altogether.

BRIEF DESCRIPTION OF THE DRAWINGS

FIG. 3 shows the relation between lapse of time and decrease of carbon content in molten steel.

FIG. 4 shows the relation between addition of cooling material and temperature of slag phase.

Figure 1:
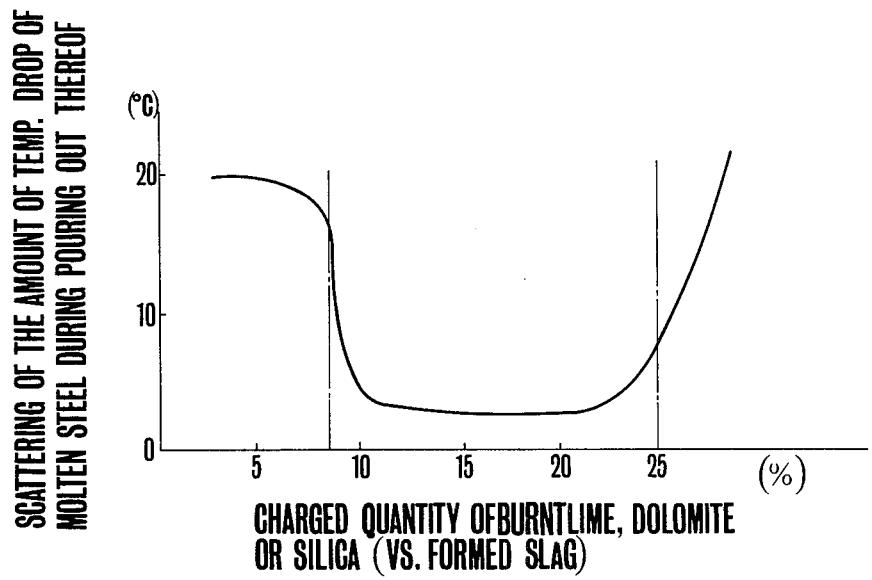
FIG. 1 is an explanatory graph showing the relation between the charged quantity of burntlime, dolomite or silica and the scattering.

SUMMARY OF THE INVENTION:

This invention relates to method for the operation of a converter, wherein above mentioned disadvantage is favorably eliminated, and when the end point is proper in the dynamic control, even if the molten steel is immediately poured out, no change in its components and temperature will be caused. The invention is characterized in that in the operation of a converter, immediately after shutdown of the oxygen blowing for refining, and preferably within about one minute thereafter, burntlime, burnt dolomite, limestone, dolomite, scrap brick, or converter slag of 8% to 25% of formed slag, are charged into the converter and within two minutes, pouring out of molten steel is started.

As a means for making the converter slag inert, the FeO in the slag may be decreased by adding deoxidizing agents (Al, Si, etc.), but this method becomes expensive and as the FeO in the slag decreases the, phosphorous recovering phenomenon is caused to increase the undesirable phosphorous in the molten steel.

The inventors have found the optimum conditions after repeating tests for making slag inert, not by means of deoxidizing agents, but by lowering the temperature thereof.

It has been found that these conditions should be completed with all of the following four items classified roughly.

(1) Selection of materials to be added for the lowering of slag temperature.

(2) Lapse of time from the shutdown of lancing to the addition of material.

(3) Quantity of material to be added.

(4) Lapse of time from the addition of material to the pouring out of the molten steel.

DETAILED EXPLANATION OF THE INVENTION

The above mentioned optimum conditions will be explained in some detail as follows.

(1) Selection of material

As materials for lowering of slag temperature, a variety of materials, such as, scrap, iron ore and the like may be used. However, those materials having a larger specific gravity will pass through the slag phase at the time of addition thereof, so that no effect is taken for lowering the temperature of slag phase, but to lower the temperature of molten steel, thus no object is attained thereby.

As the result of tests with various materials, it is found that burntlime, burnt dolomite, limestone, dolomite, scrap brick, converter slag, etc., are optimum for lowering the temperature of the slag only.

(2) Lapse of time from the shutdown of oxygen blowing to the addition of the cooling material Since the slag within a converter is floating over a large area of the surface of the melt (corresponding to the sectional area of the converter), a special device is required to spread the cooling material all over the surface of slag for the purpose of lowering temperature of the entire slag. While, it is found that the counter flow motion during refining remains still remaining in the slag phase immediately after the shutdown of the oxygen blowing (about within 1 minute) and as for this period the cooling material is dispersed over the entire region of the slag by the counter flow motion, merely by adding the material at a single spot of the slag surface.

(3) Quantity of material to be added

This is the most important factor. Since slag and molten steel are coexist in separated upper and lower phases, heat transfer from the side of molten steel when the temperature of the slag lowers, lowering the temperature of the molten steel and raising the temperature of the slag, and thus desired effect can not be obtained. To prevent these phenomena, it is found that when the proper quantity of material is added to the slag, the phase becomes less liquid phase, and more viscous, so that heat transfer between the molten steel and slag is minimized.

Thus, the quantity of material added should be in the range of 8 to 25% of the quantity of formed slag.

In the case of additional quantity of material being less than 8% of the formed slag quantity, the added material will immediately melt into slag and the temperature of slag will be somewhat lowered. However, because of the slag being in the liquid phase, heat transfer between the molten steel and slag is very rapid and an equal temperature will prevail between the slag and molten steel within one minute, so that the slag can not be made inert.

In the case of the additional quantity of material being more than 25%, because of too much quantity of added material, the counter flow motion of the slag is immediately suppressed and the cooling material is not sufficiently dispersed all over the slag, making a liquid phase portion and solid phase portion in the slag phase, which causes scattering.

When the additional quantity of material is 8 to 25%, it is found that the added material is dispersed all over slag phase by the counter flow motion of the slag, and yet the entire region of the slag decreases in temperature and enters into the viscous phase, and heat transfer between the slag and molten steel decreases, so that the period during which the slag is made inert is maximized. Particularly, the range of 10 to 22% of additional quantity of material is most desirable.

(4) Lapse of time from addition of material to pouring out of molten steel

Even though the temperature of slag is lowered in consideration of the findings mentioned in the above items (1), (2) and (3), molten steel still exists having about six times the heat content of the slag, so that the slag receives heat conduction from the molten steel to gradually raise its temperature and thus returns from the inert to the active state while lowering the temperature of molten steel.

After various studies of these phenomena, it has been found that slag maintains the state of low temperature perfectly during 2 minutes after addition of the cooling material (see FIG. 4).

It is found that the operation of pouring out of the molten steel under the inert state of converter slag is not possible until the findings mentioned in the above four items (1), (2), (3) and (4) are sufficiently satisfied.

Thus, according to this invention, in the refining by the oxygen blowing in a converter, even though the molten steel, which is refined with the desired components and temperature by means of dynamic controlling, is poured out at the same time with the shutdown of the oxygen blowing, the molten steel may be poured into a ladle without changing the components and temperature thereof, and the productivity as well as the quality of steel may be considerably improved.

Figure 2:
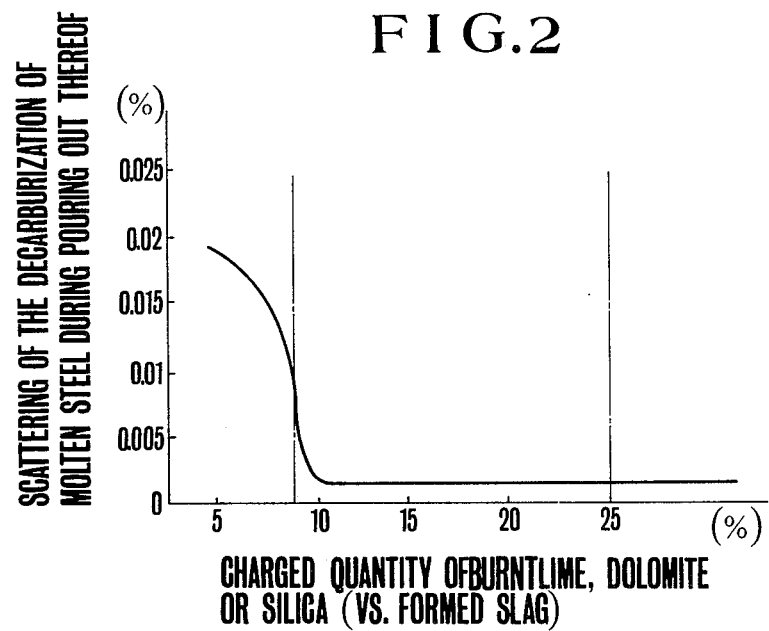
FIG. 2 is an explanatory graph showing the relation between the charged quantity of burntlime, dolomite or silica (vs. formed slag) and the scattering of the decarburization of molten steel during pouring out thereof.

In the appended drawings, FIG. 1 is an explanatory graph showing the relation between the charged quantity of burntlime, dolomite or silica (vs. formed slag) and the scattering of the amount of temperature drop of molten steel during the pouring out thereof, and FIG. 2 is an explanatory graph showing the relation between the charged quantity of burntlime, dolomite or silica (vs. formed slag) and the scattering of the decarburization of molten steel during pouring out thereof.

As seen from these drawings, if the charged quantity of material (burntlime, dolomite or silica and the like) is less than about 8% of formed slag, it is difficult to make the formed slag sufficiently inert, and the temperature drop of the molten steel during pouring out thereof is large and due to the reaction with the molten steel, the scattering of the decarburization of molten steel becomes larger. If the charged quantity of said material is more than about 25% of the formed slag, the scattering of the temperature of molten steel increases and, thus the temperature of pouring out of the molten steel becomes difficult to control.

Consequently, it is clear that the quantity of material to be charged is optimum in the range of 8 to 25%, and preferably is 10 to 22% of the amount of formed slag.

In the following, some examples of this invention will be enumerated with comparative examples.

Table 1

| Examples | Capacity of Converter | Temp. of molten steel at the time of shutdown of lancing | Carbon content at the time of shutdown of lancing | Charged time of burntlime | Quantity of charged burntlime (vs. formed slag) | Temp. of molten steel after pouring out | Carbon content of molten steel after pouring out |
|---|---|---|---|---|---|---|---|
| 1 | 250 t | 1580° C | 0.10 % | About same time with shutdown of lancing | 8.0 % | 1565° C | 0.10 % |
| 2 | " | " | " | " | 15.0 % | 1560° C | " |
| 3 | " | " | " | " | 25.0 % | 1568° C | " |
| Comparative Example | | | | | | | |
| 1 | " | " | " | / | / | 1540° C | 0.05 % |
| 2 | " | " | " | / | / | 1563° C | 0.09 % |

Table 2

| Examples | Capacity of Converter | Temp. of molten steel at the time of shutdown of lancing | Carbon content at the time of shutdown of lancing | Charged time of dolomite and the like | Quantity of charged material (us. formed slag) | Time of pouring out of molten steel | Temp. off molten steel after pouring out | Carbon content of molten steel after pouring out |
|---|---|---|---|---|---|---|---|---|
| 1 | 250 t | 1580° C | 0.10 % | About same time with shutdown of lancing | Dolomite 8.0 % | After charging of dolomite, etc. 2.0 minutes | 1565° C | 0.10 % |
| 2 | " | " | " | " | Dolomite 15.0 % | 1.5 minutes | 1560° C | " |
| 3 | " | " | " | " | Scrap brick 25.0 % | 40 seconds | 1568° C | " |
| 4 | " | " | " | " | Limestone 20.0 % | 30 seconds | 1563° C | " |
| 5 | " | " | " | " | Silica 15.0 % | 30 seconds | 1565° C | " |
| Comparative Example 1 | " | " | " | / | / | / | 1540° C | 0.05 % |
| 2 | " | " | " | / | / | / | 1563° C | 0.09 % |

Table 3

| Ex. | Capacity of Converter | Temp. of molten steel at the time of shutdown of lancing | Carbon content of molten steel of the time of shutdown of lancing | Charged time of material after shutdown of lancing | Quantity of charged material | Time of pouring out of molten steel after adding of material | Temp. of molten steel after poruing out | Carbon content of molten steel after pouring out |
|---|---|---|---|---|---|---|---|---|
| 1 | 250 t | 1580° C | 0.10% | 10 seconds | Burntline 5%<br>Dolomite 5% | 20 seconds | 1570° C | 0.10% |
| 2 | " | " | " | 30 seconds | Baked dolomite 10%<br>Scrap brick 5% | 40 seconds | 1565° C | " |
| 3 | " | " | " | 15 seconds | Limestone 10%<br>Burntlime 10% | 15 seconds | 1560° C | " |

As to the above mentioned examples, it is noted that the operation was carried out with the oxygen converter process, and that refined steel was plain steel having C 0.10%, Mn 0.3% and Si 0.001%.

What is claimed is:

1. In a method for operating a converter for the refining of steel under dynamic control wherein the steel is blown with oxygen and the oxygen blowing is accurately stopped at a predetermined temperature, and immediately thereafter, the molten steel and slag therein are poured out, the improvement which comprises adding from 8 to 25% based on the amount of slag of a cooling agent selected from the group consisting of burntlime, dolomite, lime stone, scrap bricks, converter slag, and baked dolomite, to the slag in the converter within 1 minute after the shutdown of the oxygen blowing and then starting the pouring-out of the steel from the converter within 2 minutes of the addition.

2. In a method for operating a converter for the refining of steel wherein the steel is blown with oxygen and thereafter the molten steel and slag therein are poured out, the improvement which comprises adding from 8 to 25% based on the amount of slag of a cooling agent selected from the group consisting of burntlime, dolomite, lime stone, scrap bricks, converter slag, and baked dolomite, to the converter within 1 minute after the shutdown of the oxygen blowing and then starting the pouring-out of the steel from the converter within 2 minutes of the addition.

3. The method of claim 1 wherein the amount of cooling agent added is from 10 to 22% based on the amount of slag.

* * * * *